Feb. 11, 1936.                R. B. EVANS                2,030,286
                       WINDSHIELD WIPER MECHANISM
                          Filed April 23, 1934
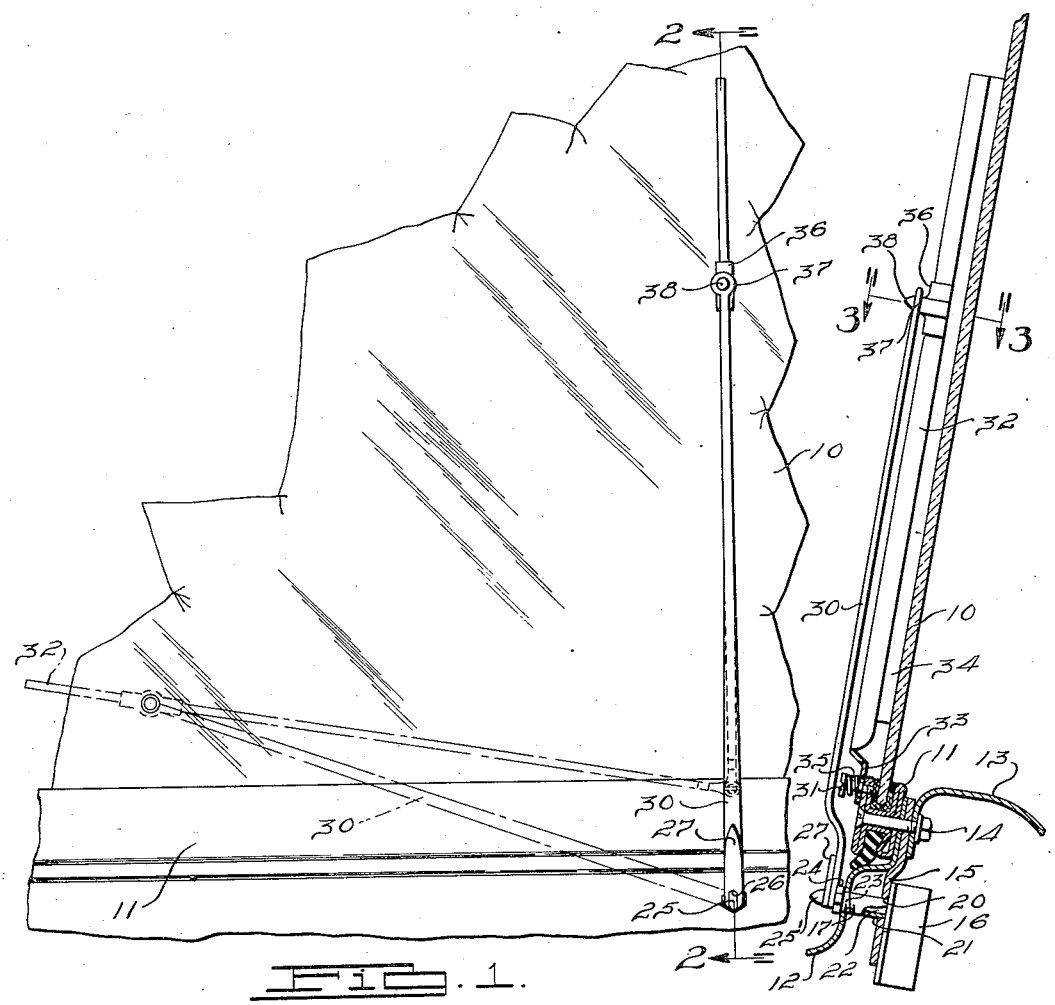
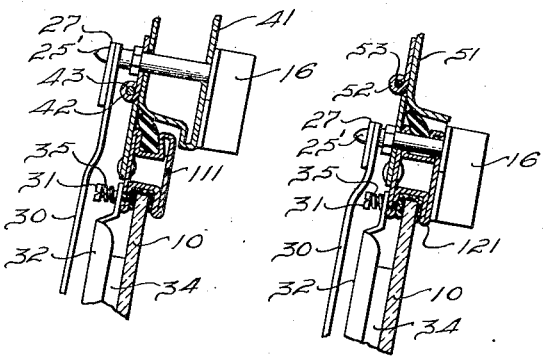
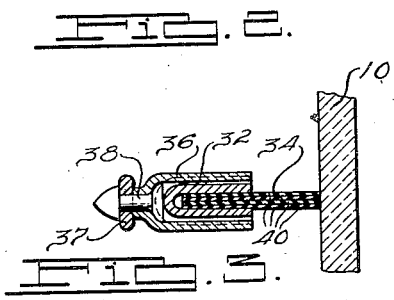
INVENTOR.
Robert B. Evans.
BY
Harness, Dickey, Pierce & Hann.
ATTORNEYS.

Patented Feb. 11, 1936

2,030,286

UNITED STATES PATENT OFFICE 2,030,286

WINDSHIELD WIPER MECHANISM

Robert B. Evans, Grosse Pointe, Mich., assignor to E. S. Evans & Sons, a corporation of Michigan Application April 23, 1934, Serial No. 721,882

5 Claims. (Cl. 15—255)

This invention relates to windshield wiper mechanism and more especially to automatic windshield cleaners.

Automatic windshield cleaners are usually provided with a motor or actuator means which may be mechanically, pressure or vacuum operated, and is adapted to be suitably supported on or adjacent the windshield. The motor or actuator is provided with an operating shaft extending transversely of the support and windshield, and a cleaner arm attached or otherwise operatively connected to this shaft and engages a cleaner element which contacts the portion of the windshield to be cleaned.

It is an object of this invention to provide a device of the above character which will be as unobtrusive as possible when not in use.

Another object of the invention is to provide a cleaner which is practically noiseless in operation.

A further object is to insure even pressure of all parts of the wiping or cleaning element against the windshield.

It is another object to make provision for returning a wiping or cleaning element, when not in use, to a position normal to the plane of the windshield, and to allow a certain amount of resiliently opposed movement from such position during cleaning operation.

Another object is to provide a windshield cleaning mechanism of the general type disclosed in the U. S. Patent to Kritz, No. 1,456,316, issued May 22, 1923, in which a windshield wiping or cleaning element is pivotally connected by means of a bracket to a windshield frame and an operating shaft is journaled in or adjacent the windshield frame but spaced from the pivotal mounting of the wiping element and provided with a spring or blade arm fixed to the end of the operating shaft and slidably engaging the wiping or cleaning element to operate and urge the latter against the windshield. In the present construction the above bracket is eliminated and the wiping or cleaning element is pivoted directly to the windshield frame within the vertical limits of the adjacent portion of such frame so that the pivotal connection between the cleaning element and the windshield frame will not be disposed within the line of vision of a person located back of the windshield.

Other objects, features and advantages will become apparent from the following description and appended claims.

For the purpose of illustrating the genus of the invention, typical concrete embodiments thereof are shown in the accompanying drawing, in which:

Fig. 1 is a front elevation of a windshield and windshield cleaning mechanism associated therewith and constructed in accordance with the principles of this invention;

Fig. 2 is a section taken on the line 2—2 of Fig. 1;

Fig. 3 is a section taken on the line 3—3 of Fig. 2; and

Figs. 4 and 5 are fragmentary sections similar to Fig. 2 of two further embodiments of this invention.

Referring to the drawing, the numeral 10 designates a transparent windshield provided with a windshield frame 11. In the embodiment illustrated in Figs. 1 and 2 the frame 11 is fixed in position to the cowling elements 12 and 13 as indicated by bolts 14. A motor or actuator support 15 is interposed between the cowling elements 12 and 13 and secured between the latter by one or more bolts 14. A motor or actuating means 16 is mounted on the support 15. The cowling elements 12 and support 15 are provided with aligned openings 17 and 20 for the reception of a bearing sleeve 21 for the operating shaft 22 of the motor or actuating means 16. The sleeve 21 may be threaded as indicated at 23 for receiving a nut 24 whereby the actuator or motor 16 may be tightly secured to the support 15. The operating or rock shaft 22 is journaled for oscillatory rotation or rocking movement in the bearing sleeve 21 and is provided at its front or outer end with a non-circular portion 25. Mounted on the non-circular portion 25 of the operating shaft 22 is the end of a spring arm 30 provided with a non-circular opening 26 complementary to the portion 25. The spring or blade arm 30 may be retained upon the non-circular portion 25 by making a press fit thereon, or by a nut 25' threaded on the end of the shaft 22, etc., and this connection may be reinforced by a strip or washer member 27. The spring or blade arm 30 is reduced toward its remaining end as by tapering the same as indicated in Fig. 1 to render the same more flexible and the arm may be sprung so that said remaining end will exert a compressive force toward the windshield 10.

A stud 31 in the form of a shouldered screw is threaded to the windshield frame 11 at a point spaced from the shaft 22 and upon this stud is pivotally attached one end of the wiping device or cleaner proper. The latter comprises a channel-like blade shield or backing member 32 provided with an ear 33 at one end thereof which is loosely journaled upon the stud 31. A strip of rubber 34 is disposed within the channel-shaped backing member 32 so that its exposed edge contacts throughout its entire length with the windshield 10. A coil spring 35 is arranged on the stud 31 in compressed condition between the head thereof and the ear 33 upon the blade holder 32 to resiliently maintain the pivoted end of the wiping or cleaning device against the windshield 10.

Reference may also be had to Fig. 3 in which a channel-shaped blade shoe 36 is illustrated as pivotally connected to an ear 37 provided on the outer end of the spring or blade arm 30 by means of a rivet 38. The shoe 36 is adapted to engage the outer or remotely disposed portion of the backing member 32 with respect to its pivoted end 33 so as to allow the spring arm 30 to urge the outer or non-pivoted end portion of the backing member toward the windshield 10. Due to the eccentric disposition of shaft 22 and pivot stud 31 this construction causes the backing member 32 to swing through a greater angle than the arm 30 during reciprocation in opposite directions. The blade shoe 36 loosely receives the blade shield 32 as indicated in Fig. 3 so that the blade shoe may rotate or "flop" slightly within the blade shoe whereby first one side and then the other of the rubber element 34 will be drawn over the surface of the windshield 10 for cleaning the same during reciprocations in opposite directions. Whenever the windshield wiper is stopped the coil spring 35 will return the blade holder 32 to a position normal to the windshield glass so as to reduce the width of the wiper element presented within the line of vision of an occupant of the vehicle. It will be noted from Fig. 3 that the rubber strip 34 may be of laminated form and comprise a plurality of thin strips 40, if desired.

In the operation of the device, oscillatory rotation of the operating or rock shaft 22 by means of the actuator or motor 16 causes swinging movement of the spring or blade arm 30 and of the blade shoe 36 mounted at the outer end thereof. The blade arm 30 resiliently presses the blade shoe 36 inwardly toward the windshield 10 to yieldingly maintain contact between the outer or non-pivoted end of the wiper element and the windshield. The coil spring 35 resiliently maintains engagement of the inner or pivoted end of the wiper element against the windshield 10. Thus independent resilient means are provided for yieldingly urging each end portion of the wiper element toward the windshield. Either or both of these resilient means may be adjusted in tension to secure uniform bearing pressure of all parts of the wiping element against the windshield 10. The coil spring 35 also serves to biasingly maintain the ear 33 of the blade shield 32 in contact with the front face of the windshield frame 11 to prevent rattling or clicking of these parts during operation of the wiper mechanism. The stud 31 and spring 35 are disposed upon the front face of the bottom frame member 11 and within the vertical limit of this portion of the windshield frame so that they are not presented within the range of view of an observer located in back of the windshield 10. Since the windshield mechanism is usually centered directly in front of an observer, it is desirable that the pivotal connection of the windshield cleaner blade is hidden from the observer's view.

Reference may now be had to Fig. 4 in which a further embodiment of the invention is depicted. In this embodiment the motor or actuating means 16 is secured to a header member 41 to which the windshield frame 111 is hingedly supported by hinge means 42 so that the windshield may be swung outwardly with respect to the hinge shaft 43. The blade shield 32 is pivotally connected to the frame member 111 within the vertical limits of the adjacent portion of the top member of the frame by means of a stud 31 and the inner end of the blade shield is pressed against the windshield 10 by means of a compression spring 35. When the windshield is swung outwardly about the hinge shaft 43 as a center the blade arm 30 yields to permit such swinging movement of the windshield. The operation of the windshield wiper mechanism shown in Fig. 4 is essentially the same as that of the mechanism illustrated in Figs. 1 and 2.

Reference may now be had to the embodiment illustrated in Fig. 5 in which a windshield 10 is provided with a frame 121 hingedly connected by means of a hinge member 52 to a header member 51. In this embodiment the motor or actuator means 16 is mounted upon the top frame member 121 of the windshield frame and a stud 31 engages the forward face of the lower portion of this frame member. In this embodiment the blade arm 30 need not be forced outwardly when the windshield is operated by rotating the same about the pivot rod 53 of hinge 52 as a center. The operation of the resilient blade arm 30 and of the compression spring 35 is the same as that of the corresponding elements in the previously described embodiments.

As many changes could be made in the above described construction and many apparently widely different embodiments of this invention could be had without departing from the spirit thereof, it is intended that all matter contained in the above description or shown in the accompanying drawing shall be interpreted as illustrative and not in a limiting sense.

What is claimed is:

1. Wiping mechanism for a windshield including a frame member, said mechanism comprising a rock shaft, means for journaling said rock shaft adjacent a margin of said frame member, means for oscillating said rock shaft, a resilient blade operating arm fixed at one end to said rock shaft for oscillation thereby, a wiper blade, means for loosely pivoting one end of said blade directly to said frame member at a point within the vertical limit of the adjacent portion of the frame member, means for slidably connecting the remaining end of said blade operating arm to said wiper blade, and resilient means supported by said pivotal means for fastening the pivoted end of said blade against said windshield.

2. Wiping mechanism for a windshield including a frame member, said mechanism comprising a rock shaft, means for journaling said rock shaft adjacent a margin of said frame member, means for oscillating said rock shaft, a resilient blade operating arm fixed at one end to said rock shaft for oscillation thereby, a wiper blade, stud means for loosely pivoting one end of said blade directly to said frame member, means for slidably connecting the remaining end of said blade operating arm to said wiper blade adjacent the remaining end of the latter, and spring means arranged on said stud means in compressed condition between a part of said stud and the pivoted end of said wiper blade for biasing said pivoted end of the wiper blade against said windshield.

3. In combination, a windshield, a frame for said windshield, a support for said frame, a bearing sleeve mounted on said support adjacent said frame, a rock shaft journaled in said bearing sleeve, motor means operatively connected to one end of said rock shaft for rotatively oscillating said shaft, a resilient blade operating arm connected at one end to the remaining end of said rock shaft for oscillation thereby, a wiper blade, means for pivotally and loosely connecting one end of said blade directly to the frame of said windshield within the vertical limits of the adjacent portion of said frame, resilient means supported by said pivotal means for biasing the pivoted end of said wiper blade against said windshield and means for slidably connecting the outer end of said blade operating arm to said wiper blade.

4. Wiping mechanism for a windshield including a frame, said mechanism comprising a bearing sleeve mounted transversely of said frame and projecting through the frame adjacent the outer edge thereof, a rock shaft journaled in said bearing sleeve, motor means operatively connected to one end of said rock shaft for rotatively oscillating said shaft, a resilient blade operating arm fixed at one end to the remaining end of said rock shaft for oscillation thereby, a wiper blade, means for pivotally connecting one end of said blade directly to the inner edge of the frame of said windshield and at a point adjacent but spaced from said bearing sleeve, resilient means supported by said pivotal means for balancing the pivoted end of the wiper blade against said windshield, and means for slidably connecting the outer end of said blade operating arm to the outer portion of said wiper blade.

5. In a windshield wiper construction, a windshield frame, an actuating arm journalled in said frame, a wiper blade, a pivot for said wiper blade comprising a stud located within the vertical limits of the adjacent portion of the frame, resilient means on said stud providing a loose, resilient mounting means for said blade and means loosely interconnecting said actuating arm and said blade.

ROBERT B. EVANS.